United States Patent [19]
Kim et al.

[11] Patent Number: 5,654,946
[45] Date of Patent: Aug. 5, 1997

[54] METHOD FOR DETERMINING REPRODUCTION POSITION OF A REPRODUCTION DEVICE

[75] Inventors: Sang Youl Kim, Seoul; Chung Ku Lee, Incheon-si, both of Rep. of Korea

[73] Assignee: Goldstar Co., Ltd., Seoul, Rep. of Korea

[21] Appl. No.: 769,317

[22] Filed: Dec. 19, 1996

Related U.S. Application Data

[60] Continuation of Ser. No. 493,407, Jun. 22, 1995, abandoned, which is a division of Ser. No. 268,595, Jun. 30, 1994, abandoned.

[30] Foreign Application Priority Data

Jul. 1, 1993 [KR] Rep. of Korea ............... 12281/1993

[51] Int. Cl.$^6$ ............................................. G11B 7/00
[52] U.S. Cl. ..................... 369/32; 369/47; 369/53; 360/72.1
[58] Field of Search ................ 369/47, 48, 54, 369/59, 58, 60, 53, 32; 360/72.1, 72.2, 74.1, 71

[56] References Cited

U.S. PATENT DOCUMENTS

| | | | |
|---|---|---|---|
| 4,527,265 | 7/1985 | d'Alayer de Costemore d'Arc | 369/47 |
| 4,841,505 | 6/1989 | Aoyagi | 369/32 |
| 5,122,999 | 6/1992 | Kimura et al. | 369/32 |
| 5,189,656 | 2/1993 | Masaki et al. | 369/47 |
| 5,233,588 | 8/1993 | Tabuchi | 369/47 |
| 5,408,448 | 4/1995 | Carman | 369/47 |
| 5,452,281 | 9/1995 | Otoguro | 369/85 |
| 5,457,672 | 10/1995 | Shinada et al. | 369/47 |
| 5,471,443 | 11/1995 | Jamail et al. | 369/47 |
| 5,473,590 | 12/1995 | Yokota et al. | 369/59 |

*Primary Examiner*—Nabil Hindi
*Attorney, Agent, or Firm*—Finnegan, Henderson, Farabow, Garrett & Dunner, L.L.P.

[57] ABSTRACT

This invention relates to a method for determining reproduction position of a reproduction device.

The method for determining a reproduction position of a disc player in a reproduction device which reproduces information recorded on a recording medium through movement of a reproduction unit, includes a first step for identifying a piece number of music which was being reproduced at the time of power off and a position of a reproduction unit at the time of power off when power is being turned on after turned off during reproduction of the piece of music recorded on a recording medium, and a second step for moving the reproduction unit to a beginning position of the piece of music which was being reproduced at the time of power off and performing normal reproduction, and the method for determining reproduction position of a record player In a reproduction device having a reproduction unit fixed and a recording medium moving for reproducing information recorded thereon, includes a first step for, when during the reproduction of a music recorded on a recording medium power is turned off and then turned on, detecting existence of information of music from a part the reproduction unit is happened to match with at the time of turn on of pieces of music recorded on a recording medium, and a second step for finding non-existence of signal of music from the pad the reproduction unit is happened to match with the recording medium at the time of turn-on and performing reproduction from the beginning of the piece of music having been reproduced at the time of turn-off.

4 Claims, 3 Drawing Sheets

METHOD FOR DETERMINING REPRODUCTION POSITION OF A REPRODUCTION DEVICE

This is a continuation of application Ser. No. 08/493,407, filed Jun. 22, 1995, which application is a divisional of Ser. No. 08/268,595 filed Jun. 30, 1994 both are now abandoned.

FIELD OF THE INVENTION

This invention relates to an audio device, more particularly to a method for determining reprobation position of a reproduction device such as a record player or a compact disc player in an automobile. An audio device can start reproduction from the beginning of a piece of music through detection of the beginning of the piece of music interrupted at the time of power off of the device, when the device is started during driving of the automobile after power off of the device at the time of stopping of operation of the automobile.

BACKGROUND OF THE INVENTION

Shown in FIG. 1 is a block diagram of a conventional record player, based on which a conventional art is to be explained hereinafter.

A conventional record player has a manipulation part 1 for selecting keys necessary to listen to a piece of music, a microprocessor 2, a memory part 3, a loading mechanism part 4 and a circuit part 5. A reproduction unit (now shown in FIG. 1) such as an optical head, a magnetic head, or a record player needle detects information stored on the disc.

The microprocessor 2 controls while power is turned on, overall operation of the record player, such as processing key signals received from the manipulation part 1, controlling record loading driving the reproduction unit in response to the processed signals, and controlling the number of revolutions of a disc etc. The microprocessor 2 also detects the positions of the piece of music of which reproduction was interrupted and the position of the reproduction unit at the time of turn-off when power is turn-off during operation of the record player, and transmits the information.

The memory part 3 has memory elements 3a such as non-volatille memory elements or memory elements using back-up power, connected to the microprocessor 2, for storing position information from the reproduction unit and piece number of the music at the time of interruption of reproduction sensed by the microprocessor 2 when power is turned-off.

The loading mechanism part 4 has a disc sensing switch SW1, a turntable (not shown) and the reproduction unit (not shown). The loading mechanism part 4 receives driving signals from the microprocessor 2 and rotates a disc in response to the driving signals to reproduce the piece of music recorded on the disc.

The circuit part 5 is connected to the microprocessor 2 and loading mechanism part 4, respectively and applies power thereon.

The conventional record player having the foregoing circuit can reproduce pieces of music recorded on a record disc by sending power to the record disc player, thus loading a record disc on the loading mechanism part 4, turning on the disc sensing switch SW1, rotating the record disc, and operating of the reproduction unit.

In this instant, the microprocessor 2 defects the position of the reproduction unit relative to the piece of music reproduced from a record disc and transmits the detected positions to the memory pad 3. The memory part 3 stores the information about the positions of the pieces of music reproduced and the reproduction unit in the memory elements 3a thereof.

The circuit part 5 applies power to the microprocessor 2 and the loading mechanism part 4, serving the device process Input signals and generating sound.

The operation of the record player shown in FIG. 1 will now be described. When a user cuts off power during operation of the record player, the microprocessor 2 senses it, and transmits information on the position of the piece number of the music and the position of the reproduction unit at the time of interruption of reproduction. The memory part 3 stores the Information on the position of the piece number of music and the position of the reproduction into the memory elements 3a.

When the user subsequently turns on the record player to listen to the music, the microprocessor read the information on the positions of the piece of music and the reproduction unit at the time of interruption of record reproduction, stored in the memory part 3 at memory element 3a. The loading mechanism part 4 then starts to reproduce the piece of music from the position where reproduction was interrupted.

That is, reproduction of the piece of music can be started reproduction from the position where reproduction has been interrupted at re-starting of the record player by having the microprocessor 2 detect the position of the reproduction unit and piece number of the music at the time of turning-off of the record player and storing information on the detected position of the reproduction unit and piece number of the music into the memory part 3.

Thus, upon turning-on again after turning-off, a conventional record player starts to reproduce either from the first piece of music of the pieces of music recorded on the disc loaded in the record player, or, as has been explained, from the part of the piece of music interrupted at the time of turn off.

Therefore, a user who listens to music for short intervals, repeatedly, especially a user of a reproduction device in an automobile may experience inconveniences that the user listens to either pieces of music recorded on the front pad of the disc frequently, or from the middle of the piece of music having been reproduced at the time of turn-off, of the many piece of recorded music.

The user may also experience inconveniences of manipulating the keys In the manipulating part, again to change tracks listen to the pieces of music either recorded on the later part of the disc or interrupted at the time of turn-off from the beginning.

SUMMARY OF THE INVENTION

The object of this invention for solving the foregoing problems is to provide a method-for determining reproduction position of a reproduction device which can reproduce a piece of music from the beginning thereof, which was being produced from a recording medium at the time of turn-off, when power is turned on after turn-off.

These and other objects and features of this invention can be achieved by providing a reproduction device which reproduces Information recorded on a recording medium through movement of a reproduction unit, with a method for determining reproduction position of the reproduction device including a first step for identifying a piece number of music which was being reproduced at the time of power off and a position of a reproduction unit at the time of power off when power is turned on again after being turned off In the middle of reproduction of the piece of music recorded on a recording medium, and a second step for moving the reproduction unit to a beginning position of the piece of music which was being reproduced at the time of power off and performing normal reproduction, and by providing a reproduction device having a reproduction unit fixed and a recording medium moving for reproducing Information recorded thereon, with a method for determining reproduction position of a reproduction device including a first step for, when the recording medium is loaded and power is turned on, detecting the existence of information of music from a part the reproduction unit is happened to match with at the time of turn on of pieces of music recorded on a recording medium, and a second step for finding non-existence of signal of music from the part the reproduction unit is happened to match with the recording medium at the time of turn-on and performing reproduction from the beginning of the piece of music having been reproduced at the time of turn-off.

DETAILED DESCRIPTION OF THE PREFERRED EMBODIMENT

Figure 1:
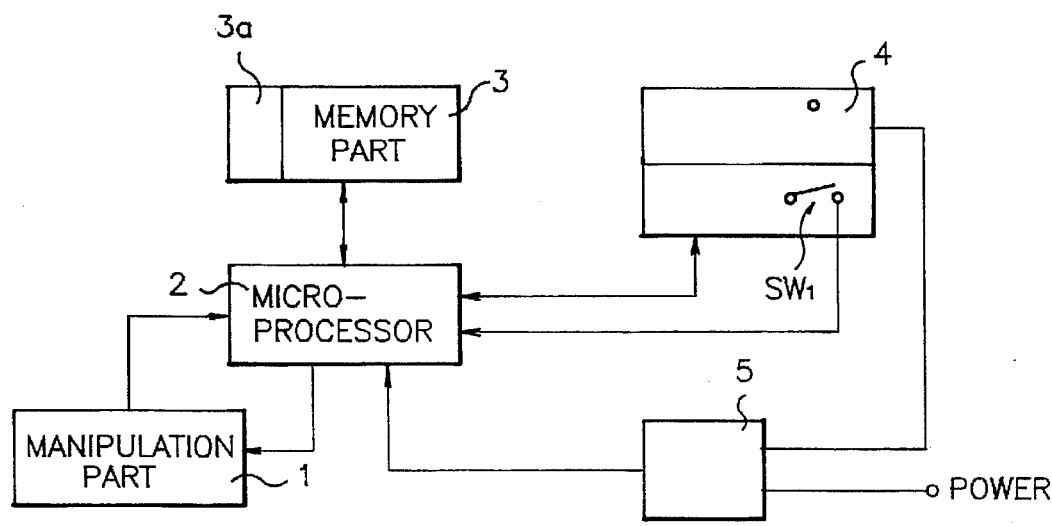
FIG. 1 is a block diagram of a conventional record player.
Figure 2:
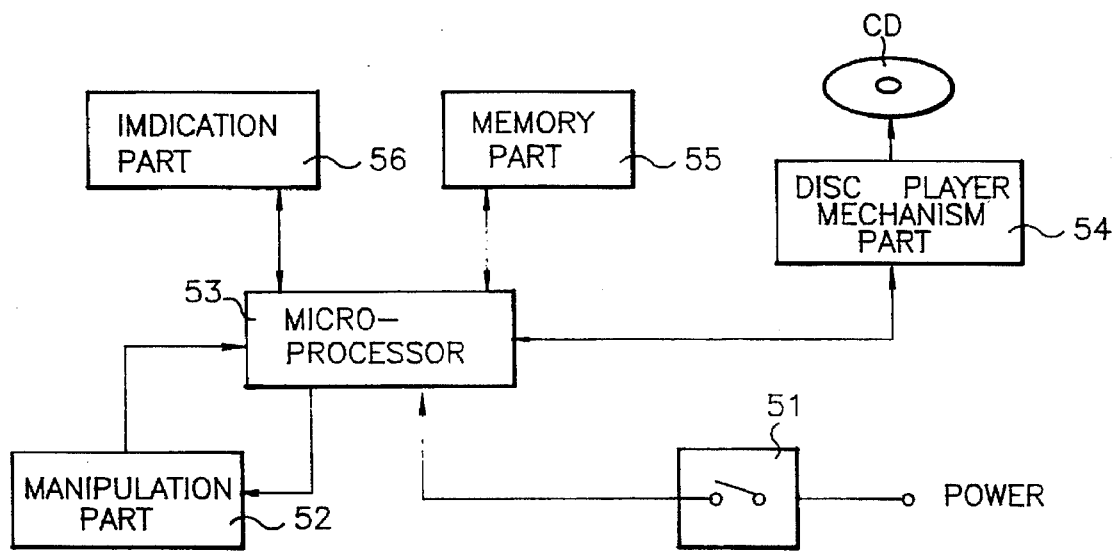
FIG. 2 is a block diagram of a disc player in accordance with a first embodiment of this invention.

Shown in FIG. 2 is a block diagram of a disc player having a reproduction unit moving in accordance with a first embodiment of this invention.

The disc player in accordance with the first embodiment has a reproduction unit moving and a recording medium fixed, wherein the reproduction unit reproduces information by reading in the information recorded on a recording medium while the reproduction unit is moved.

The disc player with the moving reproduction unit in accordance with the first embodiment of this invention has a power switch part 51, a mechanism part 52, a microprocessor 53, a disc player mechanism part 54, a memory part 55 and an indication part 56.

The power switch part 51 has a power switch SW1 for switching power for the disc player.

The manipulation part 52 has keys for applying signals corresponding to a desired piece of music or condition of sound selected by a user of a disc player.

The microprocessor 53 receives key signals from the manipulation part 52, and transmits driving signals for the disc player in response to the applied signals and information on the piece number of music reproduced from a disc by the mechanism part 54 of the disc player and position of the reproduction unit. The disc player mechanism pad 54 has the turntable reproduction unit and is a mechanical block connected to the microprocessor 53 for reproducing sound recorded on a disc in response to the control signal received from the microprocessor 53.

The memory part 55 has memory elements of non-volatile memory element or memory elements using back up power for storing the piece number of music reproduced from a disc CD sensed by the microprocessor part 53 and information on reproduction period of time and position of reproduction unit (laser reproduction device) of the disc player mechanism part 54.

The indication part 56 is connected to the microprocessor part 53 for recieving and displaying information on the piece number and reproduction period of time of music reproduced from the disc CD at the present time from the microprocessor part 53.

The method for determining reproduction position of a disc player with a moving reproduction unit having the foregiong construction includes a first step for identifying the piece number Of music reproduced and the position of the reproduction unit at the time of power turn-off when power is turn on again after being turned-off during reproduction of a piece of music recorded on a recording medium and a second step for moving the reproduction unit to a beginning position of a piece of music reproduced at the time of power off and performing normal reproduction.

Operation of determining reproduction position of a disc player in accordance with the first embodiment is to be explained hereinafter, refering to FIGS. 2 and 3.

Figure 3:
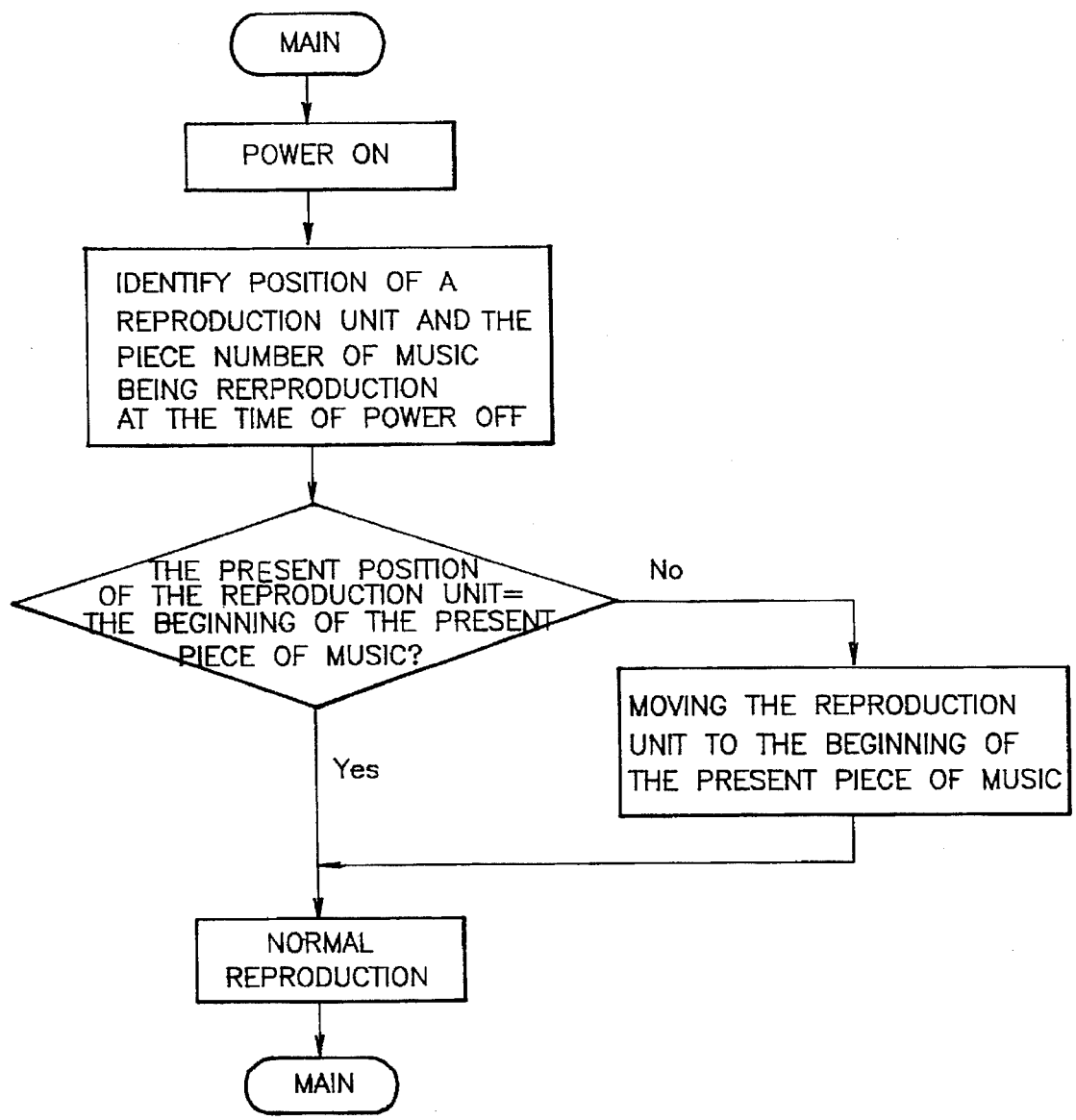
FIG. 3 is a flow chart of the disc player of FIG. 2.

As shown in FIGS. 2 and 3, while power is turned-on, when a disc is loaded on a disc player mechanism part 54, the disc CD is rotated and the reproduction unit of a disc player mechanism part 54 starts to read information on the first piece of music from the beginning of the pieces of music recorded on the disc CD and reproduce the piece of music.

In this instant, the microprocessor 53 defects information on the piece number of music, reproduction period of time and position of the reproduction unit from the disc player mechanism part 54 and transmits the information to the memory part 55 as well as the indication part 56.

Accordingly, the memory part 55 stores information on the piece number and reproduction period of time of music reproduced from a disc at the present time and the position of the reproduction unit, and, at the same time, the indication part 56 displays this information.

In the middle of reproduction of pieces of music in sequence through reading information recorded on the disc with the reproduction unit, if the disc player is turned off at a part, for example, at 3:30 of seventh piece of music, the disc is not ejected but stopped at one position until power of the reproduction until is turned on.

If power of the displayer is turned on again after being turned off in the middle of reproduction, the disc player, reading information recorded on the disc, will be operated following an operation sequence shown In the flow chart of FIG. 3.

That is, the microprocessor 53 reads in information from the memory part 55 on the position of reproduction unit at the time of power off, a piece number of music reproduced at the time of power off and the reproduction period of time, identifying the position of the reproduction unit of the disc player mechanism part 84 as well as the piece number of music.

After identification of the reproduction unit position and the piece number of music, the microprocessor checks whether the present position of the reproduction unit is the beginning part of the piece of music reproduced at the time of power turn off.

If it is found that the present position of the reproduction unit is the beginning part (0:00) of the piece of music reproduced at the time of power off, ie, the seventh piece of music, the microprocessor 53 performs a normal reproduction operation from the beginning of the piece of music.

If it is found that the present position of the reproduction unit is in the middle (3:30) of the piece of music reproduced at the time of power-off, moving the position of the reproduction unit of the disc player mechanism part 54 to the beginning part (0:00) of the seventh piece of music, the reproduction is started from the beginning part of the seventh piece of music.

Meantime, there is a way in which recorded information can be reproduced with a fixed reproduction unit and moving recording material (recording medium) information is recorded thereon, other than the way of information reproduction of the disc displayer in accordance with this invention in which recorded information is reproduced with a reproduction unit moving from inside to outside of a disc.

Figure 4:
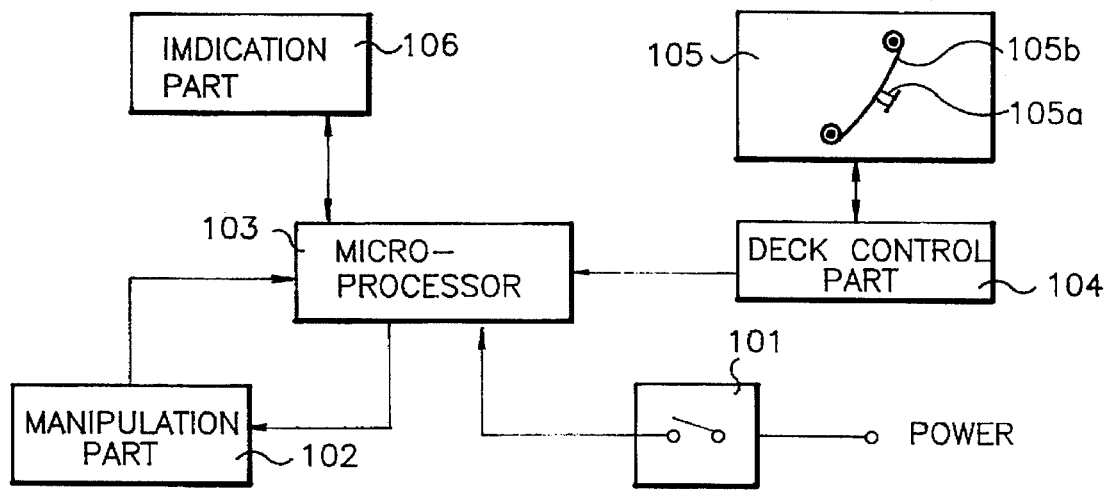
FIG. 4 is a block diagram of a record player in accordance with a second embodiment of this invention.

Shown in FIG. 4 is a block diagram of a record player having a fixed reproduction unit in accordance with a second embodiment of this invention.

The record player in accordance with the second embodiment of this invention has, different with the first embodiment, a fixed reproduction unit and a moving recording medium, wherein the recording medium is, while moving, reproduced of information recorded thereon by the reproduction unit.

The record player in accordance with the second embodiment has a power switch part 101, a manipulation part 102, a microprocessor 103, a deck control part 104, a logic deck 105 and an indication part 106. The power switch part 101 has a switch SW3 for switching power for the record player.

The manipulation part 102 has keys for applying signals for controlling operation of the device as the user wishs.

The microprocessor 103 receives key signals from the manipulation part, processes the key signals, controls overall operation of the device, and senses the piece number and reproduction period of time of music reproduced from the recording medium and the position of the reproduction unit.

The deck control part 104 receives control signals from the microprocessor 103, and controls a deck in response to the control signals.

The logic deck 105 has the reproduction unit 105a, and reproduces information recorded on a recording medium 105b in response to the control signals of the deck control part 104.

The indication part 106 receives a piece number and reproduction period of time of music being reproduced from the recording medium sensed by the microprocessor 103, and displays them.

The method for determining reproduction position of the record player includes a first step for detecting existence of information on a piece of music at a part the reproduction unit meets where the recording medium at the time of power on of the pieces of music recorded on the recording medium after power has been turned on and the recording medium has been loaded, and a second step for searching the recording medium for a part having no music signals and performing reproduction of the piece of music from the beginning.

Operation of determining the reproduction position of the record player is explained hereinafter, referring to FIGS. 4 and 5.

In reproduction devices reproducing information each with a fixed reproduction unit 105b and a moving recording medium, there are tape record players, digital compact cassettes and digital audio tape record players.

When the recording medium 105b is loaded into a deck part 106, power is turned on and information recorded on the recording medium is reproduced such record players are used to staff reproduction from the middle of a piece of music in most cases, because they start reproduction of a piece of music from a part at whith a reproduction unit 105a and a recording medium are met of pieces of music recorded on a recording medium up to now.

Figure 5:
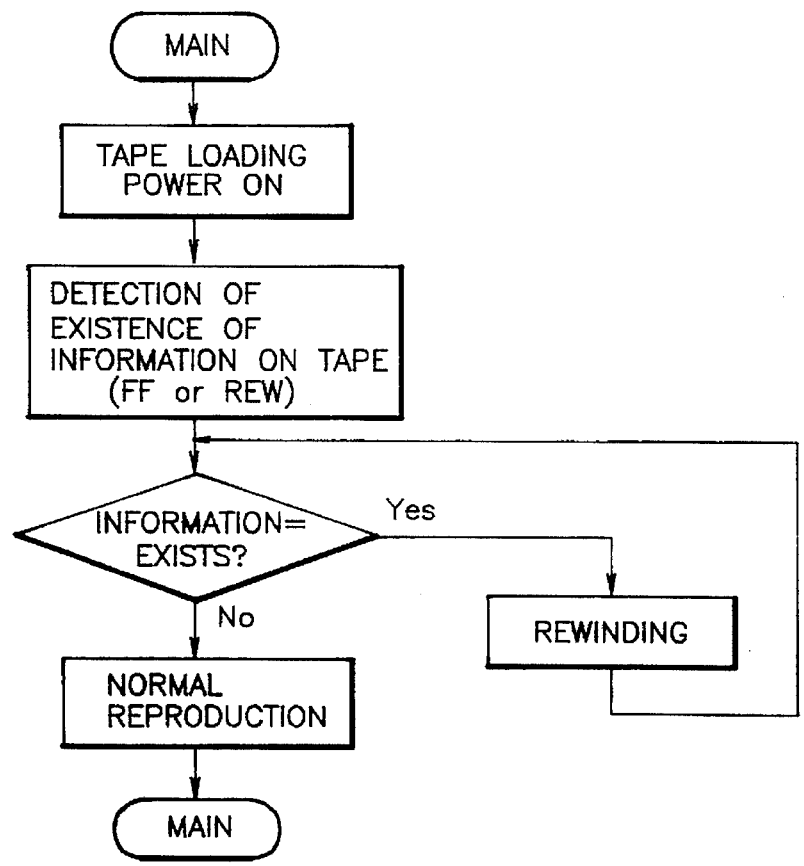
FIG. 5 is a flow chart of the record player of FIG. 4.

In order to prevent this problem, the second embodiment of this invention is provided to, when the recording medium is loaded into a logic deck part 105, and power is turned on, reproduce the piece of music being reproduce at the time of power off from the beginning through detecting existence of information on the pieces of music from a part at which the reproduction unit meets with the recording medium as shown in FIG. 5.

First, when the recording medium is loaded into the logic deck part 105 and power is turned on, detection operation for existence of information is performed.

In this instant, the information detection operation is carried out at fast forward FF operation and rewinding REW operation, wherein, in case of auto-reverse, the information detection of a piece of music recorded on the front surface is performed at rewinding REW operation and the information detection on the back surface is performed at fast forwarding FF operation.

Once the deck control part 104 detects information recorded on a part at which the reproduction unit meets with the recording medium using an information detection circuit thereof, a rewinding operation is carried out.

First, the rewinding Operation is performed until a part having no recorded information is found. When a part having no information (between pieces music) is detected using the information detection circuit thereof, the rewinding operation is stopped and a normal reproduction operation is performed, reproducing the piece of music being reproduced at the time of power off from the beginning, again.

The foregoing first and second embodiments of this invention can be applicable to all of the recording mediums, such as tape DAT, DCC and CD etc., and allows to reproduce information recorded on a recording medium form the beginning of a piece of music interrupted of reproduction at the time of power off, when the power switch is turned on again after turn off.

Thus, the foregoing methods for determining reproduction position in accordance with this invention has the advantage of allowing a user to listen to the piece of music having listened to from the beginning without any additional manipulation because the piece of music having been reproduced can be reproduced not from the middle of the piece of music as in conventional art, but from the beginning of the piece of music in case a user turns on an audio device again after turn off in the middle of the piece of music the user listened to under the circumstances.

Although the invention has been described in conjunction with specific embodiments, it is evident that many alternatives and variations will be apparent to nose skilled in the art in light of the foregiong description.

Accordingly, the invention is intended to embrace all of the alternatives and variations that fall within the spirit and scope of the appended claims.

What is claimed is:

1. A method for detecting the reproduction position of a cassette player having a fixed reproduction unit and a moving recording medium for reproducing music information recorded thereon, wherein the music information includes a plurality of pieces of music, the method comprising the steps of:

detecting, when the reproduction of music recorded on the recording medium is turned off and then turned on, whether music information exists on the recording medium at the point where the fixed reproduction unit was reproducing at the time of turn off;

searching the recording medium to locate a non-music information portion that exists between an end of a musical piece and a beginning of the next musical piece it the detecting step determines that music information exists on the recording medium at the point of turn off; and performing reproduction from the beginning of the piece of music being reproduced at the time of turn-off by starting reproduction from the located portion.

2. The method as claimed in claim 1, wherein the step of detecting existence of music information in the first step is carried out a fast forwarding operation.

3. The method as claimed in claim 1, wherein the step of detecting existence of music information in the first step is carried out a rewinding operation.

4. The method as claimed in claim 1, wherein the step of searching the recording medium to locate the non-music information portion is carried out during a rewinding operation.

* * * * *

UNITED STATES PATENT AND TRADEMARK OFFICE
CERTIFICATE OF CORRECTION

PATENT NO. : 5,654,946
DATED : August 05, 1997
INVENTOR(S) : Sang Youl KIM et al.

It is certified that error appears in the above-indentified patent and that said Letters Patent is hereby corrected as shown below:

Title Page, Item [57], in the Abstract, line 16, "In" should read --in--; and line 25, "pad" should read --part--.

Claim 1, column 7, line 9, "it" should read --if--.

Claim 2, column 8, line 3, after "carried out", insert --during--.

Claim 3, column 8, line 7, after "carried out", insert -- during--.

Signed and Sealed this

Twenty-fifth Day of November, 1997

Attest:

BRUCE LEHMAN

Attesting Officer

Commissioner of Patents and Trademarks